United States Patent [19]

Tsujii et al.

[11] Patent Number: 5,227,352
[45] Date of Patent: Jul. 13, 1993

[54] CATALYST COMPOSITION FOR CATALYTIC CRACKING OF HYDROCARBON OIL AND PROCESS FOR PRODUCING THE SAME

[75] Inventors: Mitsugu Tsujii, Saitama; Nobuki Sekine, Ibaraki; Yukihiro Mimura, Saitama; Yoshihiro Mizutani, Saitama; Mitsuru Ohi, Saitama; Seiichi Harima, Saitama; Masaki Tanno, Saitama, all of Japan

[73] Assignees: Petroleum Energy Center; Cosmo Oil Co., Ltd., both of Tokyo, Japan

[21] Appl. No.: 723,156

[22] Filed: Jun. 28, 1991

[30] Foreign Application Priority Data

Jun. 29, 1990 [JP] Japan .................... 2-172500
Mar. 31, 1991 [JP] Japan .................... 3-94786

[51] Int. Cl.$^5$ ............................................. B01J 29/08
[52] U.S. Cl. ............................ 502/65; 502/79; 502/85; 423/713
[58] Field of Search .................... 502/79, 85, 64, 65; 423/328

[56] References Cited

U.S. PATENT DOCUMENTS

| | | | |
|---|---|---|---|
| 4,588,496 | 5/1986 | Scherzer | 502/79 |
| 4,623,633 | 11/1986 | Young | 502/85 |
| 4,879,019 | 11/1989 | Ward | 502/79 |
| 4,925,820 | 5/1990 | Hoek et al. | 502/66 |
| 5,001,097 | 3/1991 | Pecoraro | 502/235 |
| 5,019,543 | 5/1991 | Davis et al. | 502/64 |
| 5,023,221 | 6/1991 | Occelli | 502/63 |

OTHER PUBLICATIONS

Dwyer et al, J. Phys. Chem. 1991, 95, 8826–8831.

*Primary Examiner*—Anthony McFarlane
*Attorney, Agent, or Firm*—Sughrue, Mion, Zinn, Macpeak & Seas

[57] ABSTRACT

A crystalline aluminosilicate which has the following characteristics:
(A) the $SiO_2/Al_2O_3$ molar ratio as determined by chemical analysis is from 5 to 15;
(B) the molar ratio of the Al content in the zeolite framework to the total Al of the aluminosilicate is from 0.3 to 0.6;
(C) the unit cell dimension is 24.30 Å or larger but less than 24.45 Å;
(D) the alkali metal content in terms of oxide is 0.02% by weight or more but less than 1% by weight in total;
(E) the pore distribution yields characteristic peaks at around 50 Å and at around 180 Å, with the volume of pores 100 Å or larger but smaller than 600 Å accounting for 10 to 40% of the whole pore volume; and
(F) the X ray diffraction pattern thereof yields characteristic peaks of zeolite Y; and a metal modified crystalline aluminosilicate characterized by an X-ray diffraction pattern characteristic of zeolite Y, which is an ion exchanged form or a metal impregnated form containing from 0.2 to 15% by weight, in terms of oxide and based on the metal modified aluminosilicate, of least one metal from rare earth elements, magnesium and calcium.

16 Claims, 4 Drawing Sheets

FIG. 3

CATALYST COMPOSITION FOR CATALYTIC CRACKING OF HYDROCARBON OIL AND PROCESS FOR PRODUCING THE SAME

FIELD OF THE INVENTION

The present invention relates to a catalyst composition for catalytic cracking of a hydrocarbon oil, more particularly, to a catalyst composition which provides excellent catalytic conversion of a bottom fraction (heavy distillate oil) and which can yield gasoline of a high octane value. The present invention also relates to a process for producing such a catalyst composition for use in the catalytic cracking of a hydrocarbon oil.

BACKGROUND OF THE INVENTION

In the petroleum refinery industry, production of gasoline by catalytic cracking at higher yield has been highly desired. Since high conversion can be obtained in catalytic cracking using zeolite-type catalysts, there are commonly employed catalysts composed of an inorganic carrier carrying therein zeolite X or zeolite Y, or stabilized zeolite Y such as USY (ultra-stable Y) zeolite to convert light distillates or bottoms (heavy distillate) obtained in an atmospheric distillation or in a vacuum distillation. Such catalysts are well known in the art, and technology related thereto is described, for example, in JP-A-Sho-58-163439 and in U.S. Pat. No. 3,449,070 (the term "JP-A" as used herein signifies "unexamined published Japanese patent application").

DESCRIPTION OF THE PRIOR ART

In the catalytic cracking of a hydrocarbon oil using a catalyst containing stabilized zeolite Y, there have been problems such as the high olefin content in the gasoline product and the low production yield of LCO, i.e., kerosene and light oil fractions. Accordingly, there have been proposed catalyst compositions comprising zeolite Y or stabilized zeolite Y which have been modified with a rare earth metal. Such zeolite compositions are effective for reducing the olefin content of gasoline, but, at the same time, they lower the octane value. There has also been proposed a method of using a catalyst system composed of a matrix of silica-alumina, $\gamma$-alumina, etc., having mixed therein zeolite Y or stabilized zeolite Y to thereby render the matrix active. However, such a catalyst system increases hydrogen and coke yield.

An object of the present invention is, accordingly, to provide a catalyst composition for use in the cracking of a hydrocarbon oil which provides products having a low olefin content and yet having a high octane value, and which also results in the lower hydrogen and coke make.

Another object of the present invention is to provide a process for producing such a catalyst composition for use in the cracking of a hydrocarbon oil.

SUMMARY OF THE INVENTION

The present inventors, after conducting extensive studies to overcome the aforementioned problems, unexpectedly found that the crystalline aluminosilicate obtained from stabilized zeolite Y by applying thereto a thermal load under specific conditions has a novel structure characterized by a particular $SiO_2/Al_2O_3$ ratio, particular unit cell dimensions, and the pore distribution thereof.

It has further been found that the use of an inorganic oxide matrix having mixed therein the novel aluminosilicate, or the ion exchanged form thereof or the metal impregnated form thereof, is also effective for overcoming the problems mentioned earlier. The present invention was based on these findings.

The first embodiment of the present invention provides a crystalline aluminosilicate which has the following characteristics:

(A) the $SiO_2/Al_2O_3$ molar ratio as determined by chemical analysis is from 5 to 15;

(B) the molar ratio of the Al content in the zeolite framework to the total Al of the aluminosilicate is from 0.3 to 0.6;

(C) the unit cell dimension is 24.30 Å or larger but less than 24.45 Å;

(D) the alkali metal content in terms of oxide is 0.02% by weight or more but less than 1% by weight in total;

(E) the pore distribution yields characteristic peaks at around 50 Å and at around 180 Å, with the volume of pores 100Å or larger but smaller than 600 Å accounting for 10 to 40% of the whole pore volume; and (F) the X ray diffraction pattern thereof yields the characteristic peaks of zeolite Y.

The second embodiment according to the present invention relates to a process for producing the crystalline aluminosilicate as described in the first embodiment of the invention, which comprises calcining stabilized zeolite Y in the temperature range of from 600° to 1200° C. for 5 to 300 minutes while controlling the decrease in the crystallinity of said stabilized zeolite Y to 20% or less, the stabilized zeolite Y initially having an $SiO_2/Al_2O_3$ molar ratio of from 5 to 15, a unit cell dimension of 24.40 Å or larger but less than 24.70 Å, and an alkali metal content in terms of oxide of 0.02% by weight or more but less than 1% by weight.

The third embodiment according to the present invention provides a metal modified composition of said crystalline aluminosilicate in the first embodiment characterized by an X-ray diffraction pattern characteristic of zeolite Y, which is in the ion exchanged form or metal impregnated form containing at least one metal selected from the group consisting of rare earth elements, magnesium, and calcium which accounts for 0.2 to 15% by weight in terms of oxide, based on the total weight of the metal modified aluminosilicate.

BRIEF EXPLANATION OF THE FIGURES

FIG. 2 is the $^{27}$Al-Magic Angle Spinning Nuclear Magnetic Resonance (MAS NMR) spectra of stabilized zeolite Y; in FIGS. 1 and 2, the abscissa indicates the shift by ppm from the peak value of the standard material $Al(NO_3)_3$, and the ordinate is the peak intensity;

DETAILED DESCRIPTION OF THE INVENTION

The present invention is described in further detail below.

The starting material for the crystalline aluminosilicate according to the first embodiment of the present invention is stabilized zeolite Y which shows improved stability in crystallinity and which is obtained by hydrothermally treating at least once zeolite Y or by chemically treating the zeolite Y (U.S. Pat. No. 4,503,023).

The stabilized zeolite Y for use as the starting material in the present invention has an $SiO_2/Al_2O_3$ molar ratio of from 5 to 15 and a unit cell dimension in the range of about 24.40 Å or more and less than 24.70 Å, preferably, about 24.50 Å or more and less than 24.60 Å.

The stabilized zeolite Y contains an alkali metal in the range of about 0.02% or more by weight and less than 1% by weight, but preferably, about 0.05% by weight or more and less than 0.8% by weight.

The crystal structure of the stabilized zeolite Y is basically the same as that of natural faujasite type zeolite. Stabilized zeolite Y is generally represented, in terms of moles, by the following formula:

$$(0.01–1.0)R_{2/m}O \cdot Al_2O_3 \cdot (5–15) SiO_2 \cdot (5–8)H_2O$$

where R represents an m-valent ion selected from an Na ion, a K ion, an alkali metal ion other than Na and K, or an alkaline earth metal ion and m is the valence of R. The stabilized zeolite Y for use in the present invention corresponds to those having a low $R_{2/m}O$ value, i.e., having a value of from 0.01 to 0.1.

That is, stabilized zeolite Y for use in the present invention are those having the characteristics summarized in the following table.

| Characteristics | Range | Preferred Range |
| --- | --- | --- |
| Bulk $SiO_2/Al_2O_3$ molar ratio as determined by chemical analysis | ≧about 5 | about 5 to 15 |
| Al in the zeolite framework/ total Al by atomic ratio | about 1.0 to 0.7 | about 0.95 to 0.75 |
| Unit cell dimension (Å) | ≧about 24.40 <24.70 | ≧about 24.50 <24.60 |
| Alkali metal conent (wt. %) (in terms of oxide) | ≧about 0.02 <about 1 | ≧about 0.05 <about 0.8 |
| Volume Ratio of pores 100Å or larger and smaller than 600Å to the whole pore volume (%) | about 2 to 15 | about 5 to 13 |

The crystalline aluminosilicate according to the first embodiment of the present invention can be obtained by applying a specified thermal load (occasionally referred to as "heat shock" hereinafter) to the stabilized zeolite Y described hereinbefore. The thermal load is applied by calcining the stabilized zeolite Y in the temperature range of from about 600° C. to 1200° C., preferably at from about 600° C. to 1000° C., and for a duration of from about 5 to 300 minutes, preferably from about 5 to 100 minutes; provided that the crystallinity is maintained at more than about 80%, preferably at more than about 85%.

If the calcining is carried out at too low a temperature, the desired product will not be obtained; on the other hand, if the treatment were to be carried at too high a temperature or for too long a duration, the crystal structure of the zeolite would be destroyed. In general, the calcining is conducted in an electric furnace or in a kiln under air or a nitrogen atmosphere at normal atmospheric pressure, but there may optionally be introduced water vapor at a partial pressure of 0 atm to 0.5 atm; a proper amount of moisture accelerates de-alumination and hence heat-shock can be applied at a lower temperature.

The heat-shock treatment is preferably applied in such a manner that the zeolite structure is not substantially damaged. Accordingly, the treatment is carried out to such a degree that the crystallinity will not decrease to about 20% or less, preferably to about 15% or less.

The crystallinity of the stabilized zeolite Y and also heat shock treated crystalline aluminosilicate is determined in accordance with the ASTM D-3906 (American Society for Testing and Materials, D-3906, 'Standard Test Method for Relative Zeolite Diffraction Intensities'), using zeolite Y (having an Si/Al ratio of 5.0 and containing 0.3% by weight of $Na_2O$, with an unit cell dimension of 24.58 Å) as the standard material, and which is expressed as 100% intensity. Specifically, the crystallinity is shown as a relative X-ray diffraction intensity ratio of the stabilized zeolite Y and heat shock zeolite to the standard material being taken as 100.

The decrease in crystallinity can then be calculated by the following equation:

$$\text{Decrease in crystallinity (\%)} = \frac{(\text{Crystallinity of the stabilized zeolite Y}) - (\text{Crystallinity of the heat shock treated crystalline aluminosilicate})}{(\text{Crystallinity of the stabilized zeolite Y})} \times 100$$

The thermal shock may be applied to the zeolite by charging the zeolite sample after the furnace had been heated and had attained a predetermined temperature, or by gradually elevating the temperature of the furnace having charged therein the sample from room temperature to the predetermined temperature. There is no particular restriction on the heating rate.

The heat shock treated crystalline aluminosilicate thus obtained is then mixed with a matrix of an inorganic oxide for use in the catalytic cracking of a hydrocarbon oil. The heat-shock treatment, however, must be applied to the zeolite prior to the mixing with the matrix. If the treatment is applied after the mixing, no particular effect according to the present invention results.

The thermal treatment to apply heat shock to the starting zeolite should be distinguished from the hydrothermally treatment of the catalyst, after the mixing with the matrix, for simulating equilibrium catalyst; moreover, hydrothermally treatment of the catalyst is conducted under more severe conditions with 100% steam.

The heat shock treated crystalline aluminosilicate according to the first embodiment of the present invention cannot be produced directly from zeolite Y by heat treatment, rather, stabilized zeolite Y must be subjected to the heat shock treatment. The reason why the zeolite Y cannot be directly converted into the heat shock treated crystalline aluminosilicate is not yet fully clarified, but it is believed that the crystal structure must be first established as that of stabilized zeolite Y. That is, by increasing $SiO_2/Al_2O_3$ ratio of zeolite Y, the initial structure is converted first into that of stabilized zeolite Y, and only upon further heat treating stabilized zeolite Y with its particular structure will the heat shock treated crystalline aluminosilicate of the present invention result.

The heat shock treated crystalline aluminosilicate according to the present invention has a bulk $SiO_2/Al_2O_3$ molar ratio, as determined by chemical analysis, of from about 5 to 15, preferably, from about 5 to 12.

The unit cell dimension of the heat shock treated crystalline aluminosilicate is about 24.30 Å or more but less than about 24.45 Å, preferably less than about 24.42 Å. The unit cell dimension can be determined from X-ray diffraction peaks by following the ASTM D-3942/85 method. Too large a unit cell dimension results in an aluminosilicate having poor hydrothermal resistance.

The heat shock treated crystalline aluminosilicate according to the present invention contains Al in the zeolite framework at an atomic ratio to the total Al content of from about 0.3 to 0.6, preferably from about 0.35 to 0.6. This Al content ratio can be calculated by equations (1) to (3) below, according to H. K. Beyer et al., *J. Chem. Soc., Faraday Trans.*, 1 (81), (1985), p. 2899, from the $SiO_2/Al_2O_3$ molar ratio as determined by chemical analysis and taking into account the unit cell dimension, which have both already been obtained as described hereinbefore.

$$N_{Al} = (a_0 - 2.425)/0.000868 \quad (1)$$

where, $a_0$ is the unit cell dimension (nm), and $N_{Al}$ is the number of Al atoms per unit cell;

$$(Si/Al) = (192 - N_{Al})/N_{Al} \quad (2)$$

$$(Al\ in\ the\ zeolite\ framework)/(Total\ Al) = [(Si/Al)\ by\ chemical\ analysis]/(Si/Al) \quad (3)$$

Equation (2) is derived from the fact that the number of atoms (Si+Al) per unit cell of the zeolite Y is 192.

Provided that the bulk $SiO_2/Al_2O_3$ molar ratio is the same, too low a ratio of the Al content in the zeolite framework to the total Al results in an aluminosilicate having poor catalytic activity. Furthermore, this situation signifies an increase in the nonframework Al content outside the framework, i.e., an increase in amorphous Al; hence, catalytic selectivity similar to that of an amorphous catalyst results. Such a catalyst yields hydrogen, increases coke make and olefin in the gasoline. If the Al content within the zeolite framework becomes high as compared with the total Al, the olefin content of the gasoline is reduced, but the hydrothermal resistance of the catalyst is impaired and coke yield increases.

The heat shock treated crystalline aluminosilicate contains the oxide of an alkali metal or an alkaline earth metal in an amount of about 0.02% by weight or more but less than about 1.0% by weight, preferably from about 0.05% by weight but less than about 1.0% by weight, and more preferably about 0.05% by weight but less than about 0.8% by weight, based on total aluminosilicate. If a large amount of alkali metal or alkaline earth metal is present in the crystalline aluminosilicate, not only is the catalytic activity lowered, but also heavy metals such as nickel and vanadium, which are commonly present in the oil, particularly in heavy oil to be treated, may deposit on the catalyst and thereby impair catalyst activity. If the content of the oxide of an alkali metal or an alkaline earth metal becomes lower than 0.02% by weight, the aluminosilicate becomes more apt to undergo structural damage, and, moreover, the catalyst, upon catalytic cracking of a nitrogen-containing hydrocarbon oil, tends to suffer a severe drop in catalytic activity.

The heat shock treated crystalline aluminosilicate preferably comprises pores which are 100 Å or larger but smaller than 600 Å in size at a volume content of from about 10 to 40%, more preferably from about 15 to 35% of the whole pore volume. Whole pore volume of less than 600 Å has about 0.2 to 0.7 cc/g. If the pores in the specified size range as set forth above account for less than about 10%, pores of smaller size become more dominant such that catalytic reactivity with larger molecules becomes impaired. This leads to a decrease in the cracking capacity of the bottoms, as well as to an increase of coke, since the cracked product becomes less diffusible from the active sites of the catalyst. If the pores in the specified size range increase in volume, the surface area decreases with an increasing content or ratio of the larger pores; hence, reactivity becomes impaired. In stabilized zeolite Y, in contrast, the pore volume of the pores in the size range of 100 Å or larger but less than 600 Å accounts for about 2 to 15%, preferably about 5 to 13% of the whole pore volume, provided that the $SiO_2/Al_2O_3$ ratio is in the same range as earlier specified. Whole pore volume of less than 600 Å has about 0.1 to about 0.5 cc/g.

The heat shock treated crystalline aluminosilicate is also characterized by its pore distribution which yields characteristic peaks around 50 Å (i.e. about 20 Å to about 60 Å) and around 180 Å (i.e. about 130 Å to about 210 Å) and by its X-ray diffractogram yielding peaks characteristic of zeolite Y. The pore size distribution and the pore volume may be measured by a conventional BET specific surface area measurement method and a conventional capillary condensation method in which determination limit is less than 600 Å.

The heat shock treated crystalline aluminosilicate can be obtained by applying a predetermined thermal load to stabilized zeolite Y, but is distinguished from its starting counterpart in that the product aluminosilicate has a unit cell dimension of about 24.30 Å or more and less than about 24.45 Å, which is clearly smaller than that of zeolite Y, which ranges from about 24.40 Å, preferably about 24.50 Å or larger and less than 24.70 Å. Another characteristic future of the heat shock treated crystalline aluminosilicate is that it has a pore size distribution which yields two characteristic peaks around 50 Å and around 180 Å.

Figure 1:
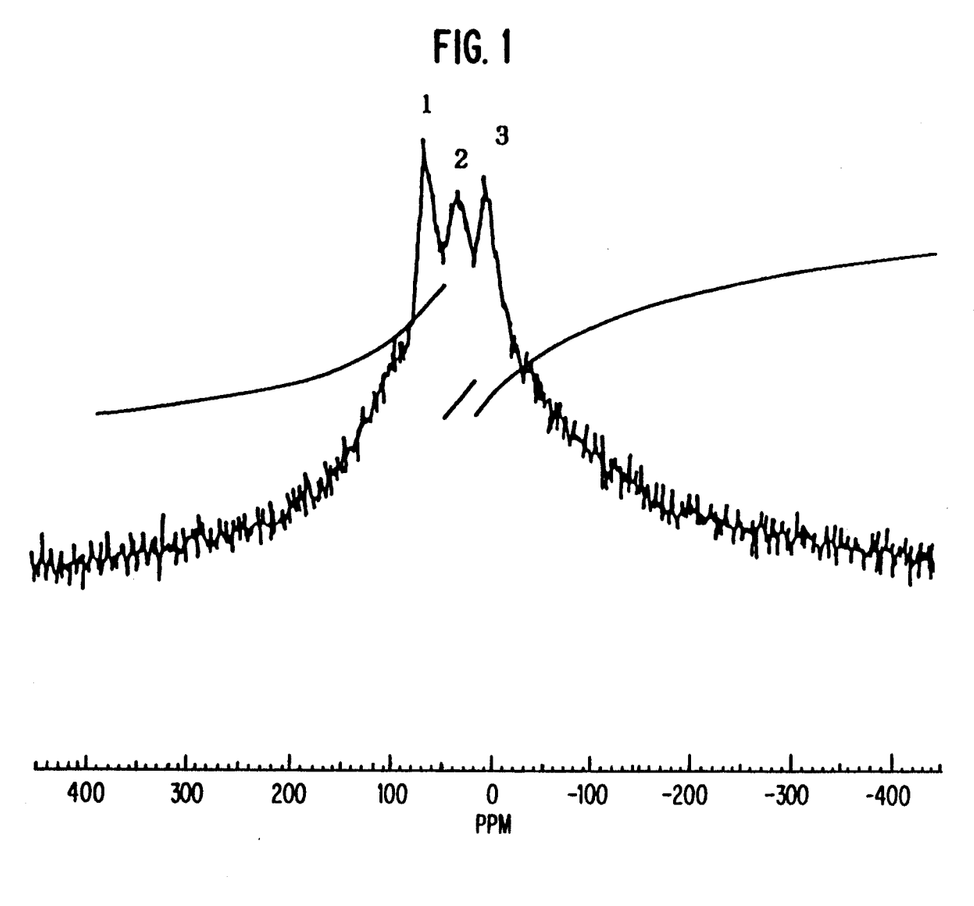
FIG. 1 is the $^{27}$Al-Magic Angle Spinning Nuclear Magnetic Resonance (MAS NMR) spectra of the crystalline aluminosilicate obtained by applying a thermal shock treatment to the stabilized zeolite Y.
Figure 2:
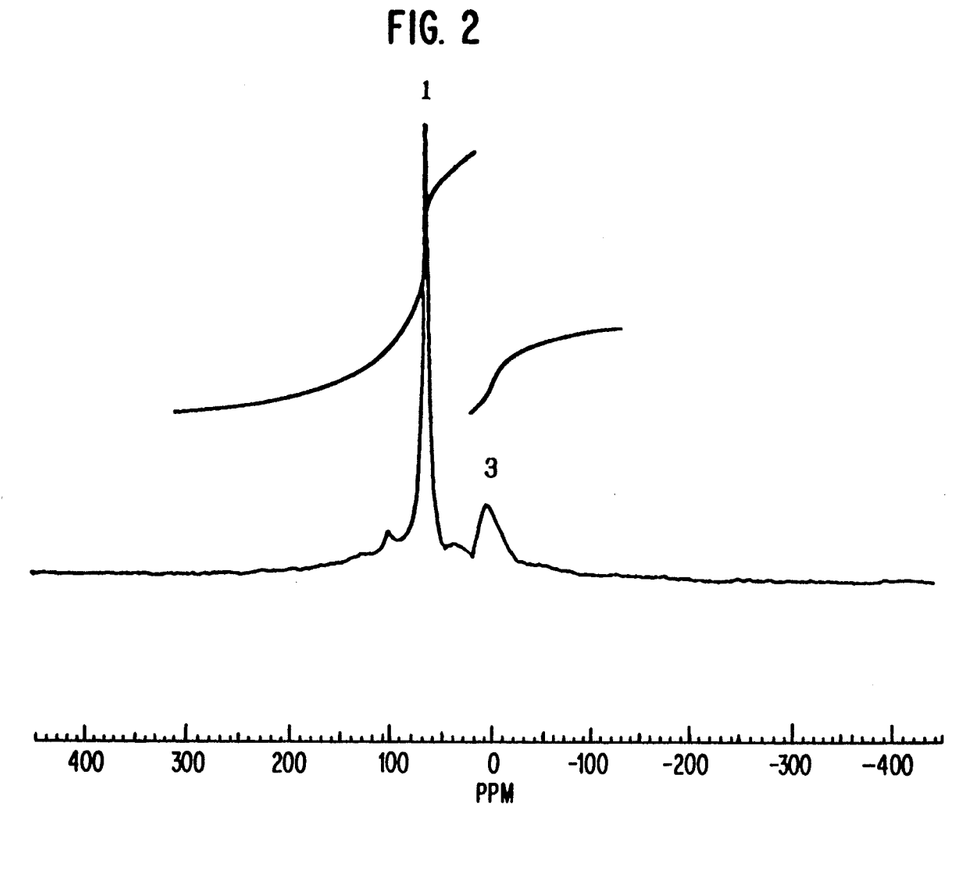

Further, another characteristic to be noted can be observed in the $^{27}Al$-Magic Angle Spinning Nuclear Magnetic Resonance (MAS NMR) spectra. As is shown in FIG. 2, stabilized zeolite Y is identified by two peaks, whereas the heat shock treated crystalline aluminosilicate according to the present invention yields 3 characteristic peaks (FIG. 1). In the Figures, the peak indicated with numeral 1 is attributed to 4-coordinated Al, i.e., the interlattice Al; that with numeral 2 is assigned to 5-coordinated Al; and that with numeral 3 identifies 6-coordinated Al, i.e., the non-framework Al.

The 5-coordinated Al indicated by peak 2 suggests, as described in the *J. Am. Chem. Soc.*, 108, (1986), pp. 6158–6162, the presence of unstable Al at its transition from the 4-coordinated site within the lattice to the 6-coordinated site outside the lattice. This peak 2 attributed to the presence of a 5-coordinated Al, however, remains for a long time period in the catalyst as long as the catalyst do not undergo hydration. In a hydrated state, peaks 1 and 3 predominate over peak 2, which makes peak 2 undetectable.

The hydrated state referred herein signifies the state the catalyst attains after allowing it to stand for about one week in air at the ambient temperature.

It can be seen that the heat shock treated aluminosilicate is characterized by its novel structure which provides an excellent cracking performances on bottoms. Furthermore, the heat shock treated crystalline aluminosilicate possesses characteristic features which will now be discussed.

The characteristics of the heat shock treated crystalline aluminosilicate are now summarized.

| Characteristics | Range | Preferred Range |
| --- | --- | --- |
| Bulk $SiO_2/Al_2O_3$ molar ratio as determined by chemical analysis | about 5 to 15 | about 5 to 12 |
| Al in the zeolite framework/total Al by atomic ratio | about 0.3 to 0.6 | about 0.35 to 0.6 |
| Unit cell dimension (Å) | ≧about 24.30 <about 24.40 | <about 24.44 |
| Alkali metal content (wt. %) (in terms of oxide) | ≧about 0.02 <about 1 | ≧about 0.05 <about 0.8 |
| Volume ratio of the pores 100Å or larger and smaller than 600Å to the whole pore volume (%) | about 10 to 40 | about 15 to 35 |

Figure 3:
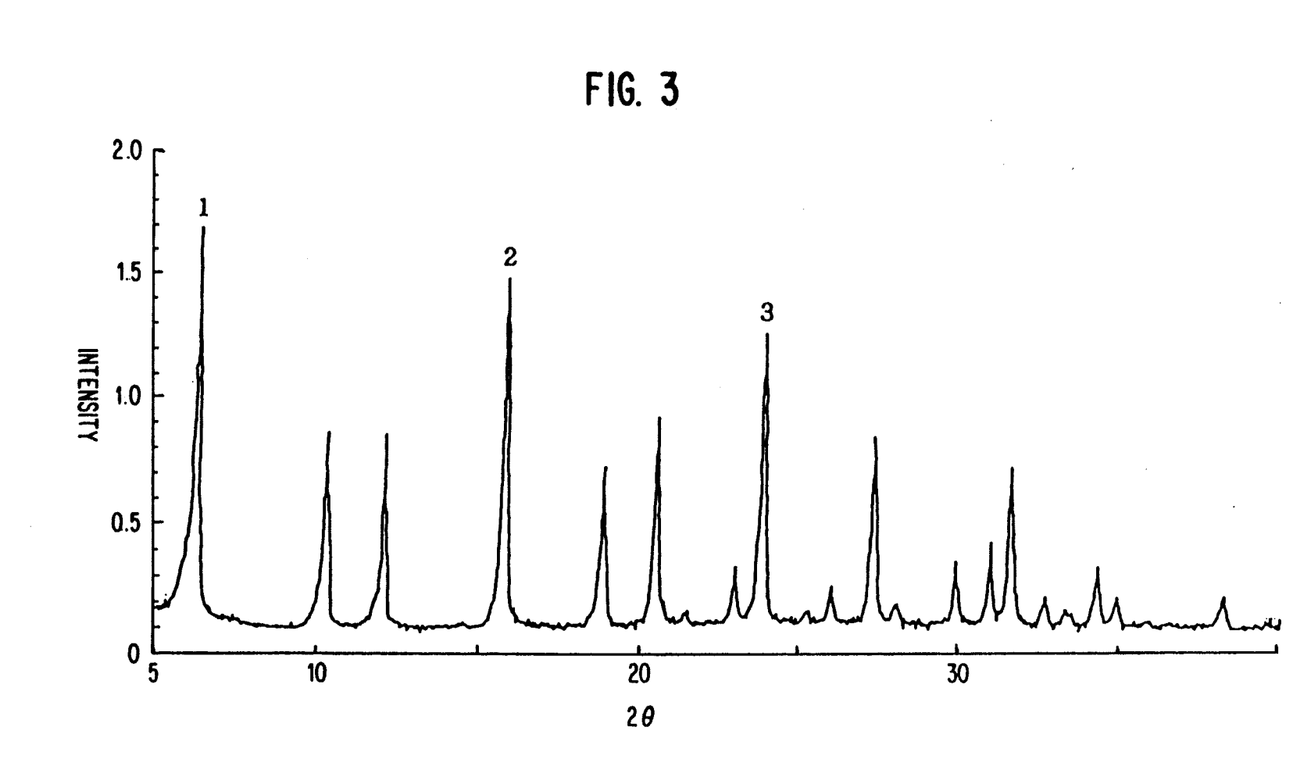
FIG. 3 is the X-ray diffraction pattern of the crystalline aluminosilicate (HZ-1) obtained by applying a thermal shock thereto, taken with a Cu K$\alpha$ radiation; in the Figure, the peaks indicated with numerals 1, 2, and 3 correspond to the principal reflections having a lattice spacing, d, of 14.1±0.2 Å, 5.61±0.1 Å, and 3.72±0.1 Å, respectively.

The heat shock treated crystalline aluminosilicate yields an X-ray diffraction pattern as shown in FIG. 3. The observed X-ray diffractogram yields the three principal peaks at the d-spacings of 14.1±0.2 Å, 5.61±0.1 Å, and 3.72±0.1 Å. The peaks in the X-ray diffractogram are read as shown in table 1.

TABLE 1

| Lattice spacing d (Å) | Relative intensity* (I/I₀) |
| --- | --- |
| 14.1 ± 0.2 | s–vs |
| 8.6 ± 0.2 | m–s |
| 7.4 ± 0.1 | m–s |
| 5.61 ± 0.1 | s–vs |
| 4.70 ± 0.1 | m–s |
| 4.32 ± 0.1 | m–s |
| 3.86 ± 0.1 | m–s |
| 3.72 ± 0.1 | s–vs |
| 3.42 ± 0.1 | w–m |
| 3.26 ± 0.1 | m–s |
| 2.98 ± 0.1 | w–m |
| 2.87 ± 0.1 | w–m |
| 2.82 ± 0.1 | m–s |
| 2.72 ± 0.1 | w–m |
| 2.68 ± 0.1 | w |
| 2.60 ± 0.1 | w–m |
| 2.56 ± 0.1 | w |
| 2.35 ± 0.1 | w |

*vs: very strong; s: strong; m: medium; w: weak.

The metal modified crystalline aluminosilicate according to the third embodiment of the present invention is a heat shock treated crystalline aluminosilicate which is an ion exchanged form or a metal impregnated form of the crystalline aluminosilicate according to the first embodiment of the present invention, containing at least one metal selected from rare earth elements, magnesium and calcium. The ion exchanged form, i.e., the heat shock treated metallic ion exchanged crystalline aluminosilicate, and the metal impregnated form, i.e., the heat shock treated metal impregnated crystalline aluminosilicate, are collectively referred to "metal modified heat shock treated crystalline aluminosilicates" hereinafter.

The rare earth elements are, for example, specifically scandium, yttrium, lanthanum, cerium and actinium. These may be used as a mixture of two or more thereof, but preferred among them is lanthanum and cerium.

The catalyst carrying the metals referred to hereinbefore by ion exchange or metal impregnation provides gasoline of high octane value with low olefin content.

The ion exchanged form of a heat shock treated crystalline aluminosilicate can be produced in any conventional manner well known in the art. The same applies to the metal impregnated form. Thus, for example, of the metal impregnated form, a dried heat shock treated crystalline aluminosilicate is immersed into or impregnated with an aqueous solution containing the modifying metal, which solution has been obtained by adding salts such as chlorides, nitrates, sulfates, and acetates of metals such as lanthanum, magnesium and calcium to water. The resulting product may be optionally heated thereafter if desired or necessary. The metal to be incorporated into the catalyst by ion exchange or metal impregnation accounts for 0.2 to 15% by weight in terms of oxide, preferably for 0.5 to 8.0% by weight in terms of oxide, based on the total weight of the metal modified heat shock treated crystalline aluminosilicate. If the metal is carried in too little an amount in the catalyst, no effect will become apparent; if the metal is carried in an excess amount, no further increase in the effect will result.

The X-ray diffractogram of the metal modified heat shock treated crystalline aluminosilicate is essentially the same as that of the heat-shock treated aluminosilicate according to the first embodiment of the present invention.

The catalyst composition according to the other embodiment of the present invention comprises a mixture of the heat shock treated crystalline aluminosilicate mentioned before with an inorganic oxide matrix, as well as a mixture of the metal modified heat shock treated crystalline aluminosilicates with an inorganic oxide matrix.

The inorganic oxide matrix referred to herein includes, for example, silica, alumina, boria, chromia, magnesia, zirconia, titania, silica-alumina, silica-magnesia, silica-zirconia, chromia-alumina, titania-alumina, titania-silica, titania-zirconia alumina-zirconia and the mixtures thereof, which may further be used with at least one clay or the like, such as montmorillonite, kaolin, halloysite, bentonite, attapulgite and bauxite.

The mixture of the inorganic oxide matrix with the heat shock treated crystalline aluminosilicate or with the metal modified heat shock treated crystalline aluminosilicates mentioned in the foregoing can be produced by any conventional method. As one of such methods, there can be mentioned a representative process which comprises adding the heat shock treated crystalline aluminosilicate or the metal modified heat shock treated crystalline aluminosilicates into a silica-alumina hydrogel or an aqueous slurry of a silica sol or an alumina sol, and spray drying the mixed and stirred product to obtain a fine powdered catalyst.

The catalyst comprises about 5 to 60% by weight, preferably from about 10 to 50% by weight, of the heat shock treated crystalline aluminosilicate or the metal modified heat shock treated crystalline aluminosilicate, and from about 40 to 95% by weight, preferably from about 50 to 90% by weight, of the inorganic oxide matrix. Thus, for example, a mixed catalyst resulting from a metal modified heat shock treated crystalline aluminosilicate contains the active metal at an amount of from about 0.01 to 9.0% by weight in terms of oxide, based on the mixed catalyst.

The catalytic cracking of a hydrocarbon oil using the catalyst compositions according to the present invention comprises effecting the catalytic cracking of a boiling hydrocarbon mixture at a temperature higher than the boiling point of gasoline, using the mixture of an inorganic oxide matrix with a heat shock treated crystalline aluminosilicate or a metal modified heat shock treated crystalline aluminosilicate.

The hydrocarbon mixture which boils at a temperature higher than the boiling point of gasoline includes the light fraction obtained by topping or vacuum distillation of crude oil, topping residue and vacuum residue. It also includes coker gas oil, solvent deasphalted oil, solvent deasphalted residue, oil extracted from tar sand or oil shale and product oil from liquefaction of coal.

In a catalytic process on an industrial scale, in general, the catalyst composition is circulated between two vessels, namely, a vertically set cracking reactor and a catalyst regenerator. The hot regenerated catalyst discharged from the catalyst regenerator is mixed with the oil to be cracked, which is then suspended in an upflowing gas which is passed through the cracking reactor. In such a manner the catalyst, once it is deactivated by the deposition of carbonaceous material thereon called coke, is separated from the products, and transported into the regenerator after the stripping. The products are separated into dry gas, LPG, a gasoline fraction and one or more heavy distillates such as light cycle oil (LCO), heavy cycle oil (HCO) and slurry oil. The heavy distillates may be further reacted by recirculating them in the cracking reactor. The used catalyst circulated into the catalyst regenerator is then regenerated by burning in air, so that the deposits on the catalyst are completely burned out. The thus regenerated catalyst is recirculated into the cracking reactor.

The process is operated under a pressure of from atmospheric pressure to 5 kg/cm$^2$, preferably from atmospheric pressure to 3 kg/cm$^2$, at a temperature range of from 400° to 600° C., preferably from 450° to 550° C., and at a catalyst to oil ratio by weight of from 2 to 20, preferably from 5 to 15.

A crystalline aluminosilicate having a novel structure has been produced in the present invention by applying a specific thermal load to stabilized zeolite Y, and, further, a metal modifying form thereof has been produced by subjecting the novel aluminosilicate to an ion exchange treatment or a metal impregnation treatment. By using this novel aluminosilicate, i.e., the heat shock treated crystalline aluminosilicate or the metal modified heat shock treated crystalline aluminosilicate as the active ingredient of a catalyst composition for use in the catalytic cracking of a hydrocarbon mixture, a gasoline of high octane value with low olefin content can be obtained.

The novel crystalline aluminosilicates according to the present invention produces light cycle oil (LCO), which corresponds to kerosene and light oil, at a high yield with low formation of hydrogen and coke. Thus, the catalytic cracking of a hydrocarbon oil according to the present invention is capable of providing useful gasoline and LPG at high selectivity with very low formation of hydrogen and coke.

Furthermore, the heat shock treated crystalline aluminosilicates according to the present invention are hydrothermally so stable that not only can the catalysts based thereon provide extended use but also the desired products are obtained at stable yield.

The present invention is now described in further detail by referring to the following Examples and Comparative Examples, but it should be understood that the present invention is not to be construed as being limited thereto. Unless otherwise indicated, all percents and parts in the following are by weight.

EXAMPLE 1

Production of the heat shock treated crystalline aluminosilicate HZ-1

Figure 4:
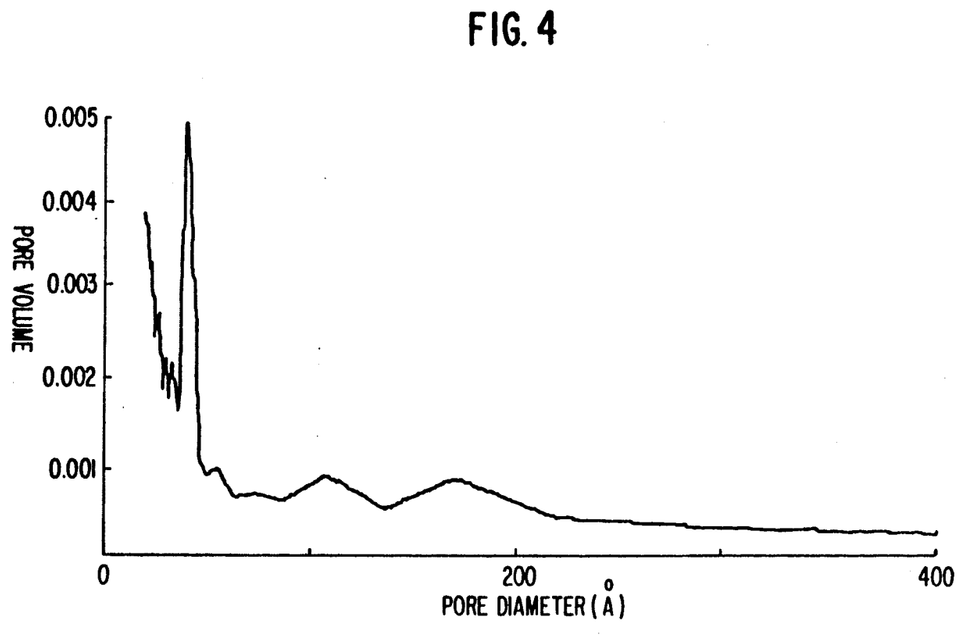
FIG. 4 shows the pore distribution of the crystalline aluminosilicate obtained by applying a thermal shock to stabilized zeolite Y.

A stabilized zeolite Y having an $SiO_2/Al_2O_3$ molar ratio of 7, containing 0.2% (in terms of oxide) of an alkali metal, and having a unit cell dimension of about 24.58 Å was calcined (heat shock) in an electric furnace in the atmosphere at 800° C. for 10 minutes to obtain a crystalline aluminosilicate having excellent hydrothermal stability. The product had the X-ray diffraction pattern characteristic of zeolite Y, and the decrease in crystallinity was 3.5%, as calculated from the crystallinity after the heat shock treatment of 112% with respect to 116% of the initial stabilized zeolite Y. The pore distribution is shown in FIG. 4. The heat shock zeolite thus obtained is designated as HZ-1, and the characteristics thereof are summarized as follows:

| | |
|---|---|
| $SiO_2/Al_2O_3$ molar ratio | 7 |
| Molar ratio of Al in the zeolite framework to total Al | 0.4 |
| Unit cell dimension (Å) | 24.38 |
| Alkali metal content (%) | |
| Pore volume ratio of the pores 100Å or larger and smaller than 600Å to the whole pore volume (%) | 25 |
| Two characteristic peaks by X-ray diffractogram | 50Å, 180Å |

Preparation of the catalyst composition A

To evaluate catalytic cracking properties, the HZ-1 obtained above was added to a silica sol together with kaolin to obtain a catalyst composition finally containing 40% each of the HZ-1 and the kaolin. The slurry thus obtained was thoroughly mixed and stirred, and spray dried to obtain a dry fine powdered catalyst A.

EXAMPLE 2

Production of the heat shock treated crystalline aluminosilicate HZ-2

A heat shock treated crystalline aluminosilicate was produced in the same manner as in Example 1, except that the calcining was conducted at 600° C. for 30 minutes in air containing water vapor at a partial pressure of 0.5 atm. The product had the X-ray diffraction pattern characteristic of zeolite Y, and the decrease in crystallinity was 10%, as calculated from the crystallinity after the heat shock treatment of 90% with respect to 100% of the initial stabilized zeolite Y. The pore distribution was the same as that shown in FIG. 4. The catalyst thus obtained is designated as HZ-2, and the characteristics thereof are summarized as follows:

| | |
|---|---|
| $SiO_2/Al_2O_3$ molar ratio | 7 |
| Molar ratio of Al in the zeolite framework to total Al | 0.5 |
| Unit cell dimension (Å) | 24.42 |
| Alkali metal content (%) | 0.2 |
| Pore volume ratio of the pores 100Å or larger and smaller than 600Å to the whole pore volume (%) | 32 |
| Two characteristic peaks by X-ray diffractogram | 50Å, 180Å |

Preparation of the catalyst composition B

A catalyst composition was prepared in the same manner as in the preparation of the catalyst composition A, except for using HZ-2 in the place of HZ-1. There was thus obtained catalyst composition B.

COMPARATIVE EXAMPLE 1

Preparation of the catalyst composition C

A catalyst composition was prepared in the same manner as in the preparation of catalyst composition A, except for using stabilized zeolite Y in the place of HZ-1. There was thus obtained comparative catalyst composition C.

EXAMPLE 3

Production of a lanthanum modified heat shock treated crystalline aluminosilicate by ion exchange treatment The HZ-1 obtained in Example 1 was subjected to an ion exchange treatment in a 0.2N lanthanum chloride aqueous solution amounting to ten times the volume of the HZ-1, at 90° C. for a duration of 0.5 hours. The ion exchanged HZ-1 was dried at 115 C for 16 hours, followed by calcination at 550° C. for 3 hours. The resulting zeolite had the X-ray diffraction pattern characteristic of zeolite Y.

Preparation of catalyst composition D

To a stirred and pH adjusted (PH=3.2) mixture of 46.3 g of water and 46.7 g of 30% silica sol were added 31.5 g (dry weight) of kaolin, 24.5 g (dry weight) of the lanthanum modified crystalline aluminosilicate produced above, and 74 g of water, and the resulting mixture was further stirred to thoroughly mix the same.

The mixture thus obtained was spray dried to yield a fine grained dry powder, which was washed five times with 2000 ml of distilled water. The resulting powder was dried at 115° C. for 16 hours to obtain catalyst composition D. Catalyst composition D contained 1.3% of lanthanum in terms of oxide, based on the weight of the total mixed catalyst final product.

EXAMPLE 4

Production of a magnesium modified heat shock treated crystalline aluminosilicate by ion exchange treatment A magnesium modified crystalline aluminosilicate was produced in the same manner as in Example 3, except for using a 0.12N magnesium nitrate aqueous solution in the place of the 0.2N lanthanum chloride aqueous solution.

Preparation of catalyst composition E

Catalyst composition E was prepared in the same manner as in Example 3, except for using the magnesium modified crystalline aluminosilicate in the place of the lanthanum modified crystalline aluminosilicate. Catalyst composition E contained 0.2% of magnesium in terms of oxide, based on the weight of the total mixed catalyst final product.

EXAMPLE 5

Production of a calcium modified heat shock treated crystalline aluminosilicate by ion exchange treatment A calcium modified crystalline aluminosilicate was produced in the same manner as in Example 3, except for using a 0.17N calcium nitrate aqueous solution in the place of the 0.2N lanthanum chloride aqueous solution.

Preparation of catalyst composition F

Catalyst composition F was prepared in the same manner as in Example 3, except for using the calcium modified crystalline aluminosilicate in the place of the lanthanum modified crystalline aluminosilicate. Catalyst composition F contained 0.4% of calcium in terms of oxide, based on the weight of the total mixed catalyst final product.

COMPARATIVE EXAMPLE 2

A comparative catalyst composition was prepared in the same manner as in Example 3, except for using the stabilized zeolite Y used in Example 1 in the place of the HZ-1 catalyst. The catalyst composition thus obtained, designated catalyst composition G, contained 1.3% of lanthanum in terms of oxide, based on the weight of the total mixed catalyst final product.

COMPARATIVE EXAMPLE 3

A comparative catalyst composition was prepared in the same manner as in Example 4, except for using the stabilized zeolite Y used in Example 1 in the place of the HZ-1 catalyst. The catalyst composition thus obtained, designated catalyst composition H, contained 0.2% of magnesium in terms of oxide, based on the weight of the total mixed catalyst final product.

COMPARATIVE EXAMPLE 4

A comparative catalyst composition was prepared in the same manner as in Example 5, except for using the stabilized zeolite Y used in Example 1 in the place of the HZ-1 catalyst. The catalyst composition thus obtained, designated catalyst composition I, contained 0.4% of calcium in terms of oxide, based on the weight of the mixed catalyst final product.

Micro-activity Test

The catalytic cracking properties of catalyst compositions A to C thus obtained were evaluated using the same oil under the same conditions while using an ASTM standardized fixed bed type micro-activity testing apparatus. The catalyst compositions tested were treated prior to the testing in a 100% steam atmosphere at 800° C. for 6 hours so that they reached a quasi-equilibrium state. The test was carried out on a desulfurized vacuum gas oil, at the following testing conditions:

| | |
|---|---|
| Reaction temperature | 500° C. |
| Catalyst/Oil feed ratio | 3.0 (weight ratio) |
| WHSV | 16 h$^{-1}$ |
| Testing duration | 75 seconds |

The results obtained are given in Table 2.

TABLE 2

| | Catalyst Composition | | |
|---|---|---|---|
| | A | B | C |
| Micro-activity test results (wt. %) | | | |
| Hydrogen | 0.3 | 0.3 | 0.4 |
| $C_1-C_2$ | 0.9 | 1.1 | 1.0 |
| LPG | 12.9 | 13.0 | 13.1 |
| Gasoline | 42.2 | 42.1 | 41.7 |
| KCO | 28.7 | 28.5 | 27.1 |
| HCO$^+$ | 13.1 | 13.0 | 14.2 |
| Coke | 1.9 | 2.0 | 2.5 |
| Conversion | 58.2 | 58.5 | 58.7 |
| Paraffins | 35.2 | 35.4 | 35.5 |
| Olefins | 30.2 | 30.2 | 31.2 |
| Naphthenes | 9.4 | 9.4 | 8.5 |
| Aromatics | 25.2 | 25.0 | 24.8 |
| Octane value by Gas Chromatography | 85.6 | 85.5 | 85.2 |

It should be noted that the test was conducted using a fixed bed type testing apparatus for the micro-activity test, and the favorable conditions therefor are not always in accordance with the operating conditions of the fluidized catalytic cracking apparatus commonly used on an industrial scale.

Activity Test in a Pilot Plant Unit

In Apparatus I

Catalysts A to C obtained above were evaluated with respect to the catalytic cracking properties on a hydrocarbon oil using a larger pilot plant unit. This unit was a scaled down version of a catalytic cracking plant actually used in commercial production, which was a circulation type fluidized bed reactor equipped with a cracking reaction vessel and a catalyst regeneration vessel.

Prior to the testing, 650 ppm of Ni and 1250 ppm of V were impregnated by the Mitchell method on the surface of each catalyst, and the resulting catalysts were deactivated under 100% steam at 785° C. for 8 hours.

The test was conducted using catalysts A to C using a desulfurized vacuum gas oil as the feed oil, at a reaction temperature of 500° C., while circulating the catalyst at a rate of 60 g/minute. The catalyst to oil ratio was varied at 5 levels, i.e., 4, 7, 9, 5, and 12, and from the results thus obtained, the results which yielded 68% conversion were selected as the standard value for comparison.

In Apparatus II

The test was conducted on catalysts D to I in the same manner as in the test described for Apparatus I, except that the cracking reactor used in Apparatus II had a riser having a lean phase as compared with that of Apparatus I. In this case, the results yielding 66% conversion were used as the standard for the comparison.

The results are given in Table 3.

It was assumed, for catalysts D to I, that the olefin content would be further reduced as compared with the results obtained on Apparatus II, if the test were to be carried out on Apparatus I. This is believed to be ascribable to the characteristics of the apparatuses.

TABLE 3

| | Run No. | | |
|---|---|---|---|
| | 1 | 2 | 3 |
| | Catalyst Composition | | |
| | A | B | C |
| | (wt. %) | | |
| Activity test results in a pilot plant unit | | | |
| Hydrogen | 0.2 | 0.2 | 0.3 |
| $C_1-C_2$ | 1.4 | 1.3 | 1.6 |
| LPG | 14.4 | 14.1 | 13.7 |
| Gasoline | 49.6 | 49.8 | 49.0 |
| LCO | 21.9 | 21.6 | 20.7 |
| HCO | 9.7 | 10.1 | 11.3 |
| Coke | 2.8 | 2.9 | 3.4 |
| Conversion | 68.4 | 68.3 | 68.0 |
| Paraffins | 37.8 | 37.8 | 32.5 |
| Olefins | 46.2 | 46.3 | 51.4 |
| Aromatics | 16.0 | 15.9 | 16.1 |
| CFR Octane value (RON) | 92.9 | 92.8 | 92.6 |

| | Run No. | | |
|---|---|---|---|
| | 4 | 5 | 6 |
| | Catalyst Composition | | |
| | D | E | F |
| | La-ion exchanged | Mg-ion exchanged | Ca-ion exchanged |
| | | (wt. %) | |
| Hydrogen | 0.1 | 0.1 | 0.2 |
| $C_1-C_2$ | 1.4 | 1.2 | 1.2 |
| LPG | 11.1 | 11.3 | 11.9 |
| Gasoline | 50.4 | 51.4 | 50.5 |
| LCO | 24.6 | 24.0 | 23.8 |
| HCO | 9.8 | 9.6 | 10.1 |
| Coke | 2.6 | 2.4 | 2.3 |
| Conversion | 65.6 | 66.4 | 66.1 |
| Paraffins | 39.6 | 40.1 | 38.8 |
| Olefins | 44.1 | 43.8 | 45.7 |
| Aromatics | 16.3 | 16.1 | 15.5 |
| CFR Octane value (RON) | 92.3 | 92.0 | 92.5 |

| | Run No. | | |
|---|---|---|---|
| | 7 | 8 | 9 |
| | Catalyst Composition | | |
| | G | H | I |
| | La-ion exchanged | Mg-ion exchanged | Ca-ion exchanged |
| | | (wt. %) | |
| Hydrogen | 0.2 | 0.2 | 0.2 |
| $C_1-C_2$ | 1.4 | 1.3 | 1.4 |
| LPG | 11.7 | 11.7 | 12.0 |
| Gasoline | 49.9 | 49.7 | 49.4 |
| LCO | 23.2 | 22.9 | 22.2 |
| HCO | 10.7 | 11.4 | 11.9 |
| Coke | 2.9 | 2.8 | 2.9 |
| Conversion | 66.1 | 65.7 | 65.9 |
| Paraffins | 40.2 | 40.6 | 39.1 |
| Olefins | 45.0 | 44.4 | 45.8 |
| Aromatics | 14.8 | 15.0 | 15.1 |
| CFR Octane value (RON) | 91.7 | 91.4 | 92.0 |

Evaluation of Hydrothermal Stability

The hydrothermal stability of the heat shock treated crystalline aluminosilicate HZ-1 according to the first embodiment of the present invention was evaluated after a hydrothermal treatment conducted under the following conditions. The results are given in Table 4.

| Conditions | |
|---|---|
| Temperature | 500, 600, 700° C. |
| Atmosphere | 100% steam |

-continued

| Conditions | |
|---|---|
| Duration | 1.0 hour |

The catalyst obtained after the treatment was checked for (1) change in unit cell dimension, and (2) influence on the reaction rate constant upon cracking hexane.

The cracking reaction of hexane was carried out at 500° C. under normal pressure, while flowing hexane at a rate of 0.276 g/minute for a duration of 5 minutes. The amount of the flowing catalyst was varied in three levels, i.e., 0.3, 0.7, and 1.0 g.

The results are shown in Table 4.

TABLE 4

| | HZ-1 | stabilized zeolite Y |
|---|---|---|
| $SiO_2/Al_2O_3$ molar ratio | 7.0 | 6.9 |
| Unit cell dimension (Å) | 24.38 | 24.58 |
| At 500° C. | 24.38 | 24.46 |
| At 600° C. | 24.37 | 24.41 |
| At 700° C. | 24.35 | 24.40 |
| Decrease in the cracking reaction rate constant of hexane (%) | | |
| Fresh | 0.0 | 0.0 |
| At 500° C. | 11.1 | 40.0 |
| At 600° C. | 20.5 | 70.9 |
| At 700° C. | 49.2 | 87.8 |

Table 4 clearly shows that the heat shock treated crystalline aluminosilicate has improved structural stability and provides an improved cracking rate of hexane as compared with stabilized zeolite Y having almost the same $SiO_2/Al_2O_3$ ratio; the heat shock treated crystalline aluminosilicate had an excellent hydrothermal stability.

While the invention has been described in detail and with reference to specific embodiments thereof, it will be apparent to one skilled in the art that various changes and modifications can be made therein without departing from the spirit and scope thereof.

What is claimed is:

1. A crystalline aluminosilicate which has the following characteristics:
   (A) an $SiO_2/Al_2O_3$ molar ratio as determined by a chemical analysis of from 5 to 15;
   (B) a molar ratio of Al content in the zeolite framework to the total Al of the aluminosilicate of from 0.3 to 0.6;
   (C) an unit cell dimension of 24.30 Å or larger but less than 24.45 Å;
   (D) an alkali metal content, in terms of oxide, of 0.02% by weight or more but less than 1% by weight in total;
   (E) a pore distribution which yields characteristic peaks at around 50 Å and at around 180 Å, with the volume of pores 100 Å or larger but smaller than 600 Å accounting for 10 to 40% of the total pore volume; and
   (F) an X ray diffraction pattern thereof which yields characteristic peaks of zeolite Y.

2. The crystalline aluminosilicate as claimed in claim 1, where the $SiO_2/Al_2O_3$ molar ratio as determined by chemical analysis is from 5 to 12.

3. The crystalline aluminosilicate as claimed in claim 1, wherein the molar ratio of the Al content in the zeolite framework to the total Al of the aluminosilicate is from 0.35 to 0.6.

4. The crystalline aluminosilicate as claimed in claim 1, wherein the unit cell dimension is 24.30 Å or larger but less than 24.42 Å.

5. The crystalline aluminosilicate as claimed in claim 1, wherein the alkali metal content, in terms of oxide, is 0.05% by weight or more but less than 0.8% by weight in total.

6. The crystalline aluminosilicate as claimed in claim 1, wherein the volume of pores 100 Å or larger but smaller than 600 Å accounts for 15 to 35% of the total pore volume.

7. A catalyst composition for use in a catalytic cracking reaction, which is a mixture comprising the crystalline aluminosilicate of claim 1 and an inorganic oxide matrix.

8. The catalyst composition for use in a catalytic cracking reaction as claimed in claim 7, wherein the mixture comprises from 5 to 60% by weight of the crystalline aluminosilicate and from 40 to 95% by weight of the inorganic oxide matrix.

9. A metal modified crystalline aluminosilicate characterized by an X-ray diffraction pattern characteristic of zeolite Y, which has been modified by being ion exchanged with or impregnated with a metal so that the metal modified crystalline aluminosilicate contains at least one of the metals selected from the group consisting of rare earth elements, magnesium and calcium which accounts for from 0.2 to 15% by weight in terms of oxide based on the total weight of the metal modified aluminosilicate, wherein said crystalline aluminosilicate has the following characteristics:
   (A) $SiO_2/Al_2O_3$ molar ratio as determined by a chemical analysis of from 5 to 15;
   (B) a molar ratio of Al content in the zeolite framework to the total Al of the aluminosilicate of from 0.3 to 0.6;
   (C) a unit cell dimension of 24.30 Å of larger but less than 24.45 Å;
   (D) an alkali metal content, in terms of oxide, of 0.02% by weight or more but less than 1% by weight in total;
   (E) a pore distribution which yields characteristic peaks at around 50 Å and at around 180 Å, with the volume of pores 100 Å or larger but smaller than 600 Å accounting for 10 to 40% of the total pore volume; and
   (F) an X-ray diffraction pattern thereof which yields characteristic peaks of zeolite Y.

10. The metal modified crystalline aluminosilicate as claimed in claim 9, wherein the rare earth elements are scandium, yttrium, lanthanum, cerium or actinium.

11. The metal-modified crystalline aluminosilicate as claimed in claim 9, wherein at least one metal selected from the group consisting of rare earth elements, magnesium and calcium accounts for 0.5 to 8.0% by weight, in terms of oxide, based on the total weight of the metal-modified crystalline aluminosilicate.

12. A catalyst composition for use in a catalytic cracking reaction, which is a mixture comprising the metal-modified crystalline aluminosilicate of claim 9 and an inorganic oxide matrix.

13. A catalyst composition for use in a catalytic cracking reaction, which is a mixture comprising from 5 to 60% by weight of the metal modified crystalline aluminosilicate of claim 9 and from 40 to 95% by weight of an inorganic oxide matrix.

14. A process for producing the crystalline aluminosilicate which has the following characteristics:

(A) an $SiO_2/Al_2O_3$ molar ratio as determined by a chemical analysis of from 5 to 15;

(B) a molar ratio of Al content in the zeolite framework to the total Al of the aluminosilicate of from 0.3 to 0.6;

(C) a unit cell dimension of 24.30 Å or larger but less than 24.40 Å;

(D) an alkali metal content, in terms of oxide, of 0.02% by weight or more but less than 1% by weight in total;

(E) a pore distribution which yields characteristic peaks at around 50 Å and at around 180 Å, with the volume of pores 100 Å or larger but smaller than 600 Å accounting for 10 to 40% of the total pore volume; and (F) an X ray diffraction pattern thereof which yields characteristics peaks of zeolite Y which process comprises calcining a stabilized zeolite Y in the temperature range of from 600° to 1200° C. for 5 to 300 minutes while controlling the decrease in the crystallinity of said stabilized zeolite Y to 20% or less, said stabilized zeolite Y initially having an $SiO_2/Al_2O_3$ molar ratio of from 5 to 15, a unit cell dimension of 24.45 Å or larger but less than 24.70 Å, and an alkali metal content in terms of oxide of 0.02% by weight or more but less than 1% by weight.

15. The process for producing the crystalline aluminosilicate as claimed in claim 14, wherein the calcining is conducted at a temperature range of from 600° to 1000° C. for 5 to 100 minutes.

16. The process for producing the crystalline aluminosilicate as claimed in claim 14, wherein the calcining is conducted while controlling the decrease in the crystallinity of the stabilized zeolite Y to 15% or less.

* * * * *